United States Patent
Thebault et al.

(10) Patent No.: US 9,686,528 B2
(45) Date of Patent: Jun. 20, 2017

(54) DEALIASING METHOD AND DEVICE FOR 3D VIEW SYNTHESIS

(71) Applicant: THOMSON LICENSING, Issy de Moulineaux (FR)

(72) Inventors: Cedric Thebault, Chantepie (FR); Didier Doyen, La Bouexiere (FR); Matthieu Fradet, Chanteloup (FR)

(73) Assignee: THOMSON LICENSING, Issy les Moulineaux (FR)

( * ) Notice: Subject to any disclaimer, the term of this patent is extended or adjusted under 35 U.S.C. 154(b) by 240 days.

(21) Appl. No.: 14/411,492

(22) PCT Filed: Jan. 16, 2013

(86) PCT No.: PCT/EP2013/050701
§ 371 (c)(1),
(2) Date: Dec. 27, 2014

(87) PCT Pub. No.: WO2014/000893
PCT Pub. Date: Jan. 3, 2014

(65) Prior Publication Data
US 2015/0172621 A1 Jun. 18, 2015

(30) Foreign Application Priority Data

Jun. 28, 2012 (EP) .................................. 12174005

(51) Int. Cl.
*H04N 13/00* (2006.01)
*H04N 13/02* (2006.01)

(52) U.S. Cl.
CPC ..... *H04N 13/0018* (2013.01); *H04N 13/0011* (2013.01); *H04N 13/0033* (2013.01); *H04N 13/0048* (2013.01); *H04N 13/026* (2013.01)

(58) Field of Classification Search
None
See application file for complete search history.

(56) References Cited

U.S. PATENT DOCUMENTS

| 6,577,307 B1 | 6/2003 | Hsiao et al. |
| 7,015,926 B2 | 3/2006 | Zitnick, III et al. |
| (Continued) | | |

FOREIGN PATENT DOCUMENTS

| EP | 1383315 | 1/2004 |
| EP | 1519319 | 3/2005 |
| (Continued) | | |

OTHER PUBLICATIONS

Bleyer etal: "A Stereo Approach That Handles the Matting Problem via Image Warping"; 2009 IEEE, pp. 501-508.
(Continued)

*Primary Examiner* — Sath V Perungavoor
*Assistant Examiner* — Janese Duley
(74) *Attorney, Agent, or Firm* — Tutunjian & Bitetto, P.C.

(57) ABSTRACT

The present disclosure is directed to a method and a device for dealiasing borders in a 3D interpolated view, the interpolated view comprising at least foreground pixels with foreground video in formation and background pixels with background video information. The method comprises the step of detecting, in an interpolated disparity map, associated to the 3D interpolated view, an aliased border between the foreground pixels with a foreground disparity value and the background pixels with a background disparity value, the aliased border delimiting an inner aliased contour formed by foreground pixels and an outer aliased contour formed by background pixel, the aliased border having the form of a stair line; determining a weighting/dealiasing coefficient for each pixel of the outer contour said coefficient corresponding to the part of the pixel area included in the virtual right triangle defined by the two sides of each stair line to the area of the pixel; calculating video information for each pixel of the outer contour in combining the background video information and the foreground video information in (Continued)

a proportion defined by the determined weighting/dealiasing coefficient and replacing video information for each pixel of the outer contour by the calculated video information.

9 Claims, 6 Drawing Sheets

(56) References Cited

U.S. PATENT DOCUMENTS

| | | | |
|---|---|---|---|
| 2002/0130886 A1* | 9/2002 | Baldwin | G06T 15/005 345/611 |
| 2004/0058715 A1* | 3/2004 | Taniguchi | G06F 3/1423 455/566 |
| 2004/0222988 A1 | 11/2004 | Donnelly | |
| 2005/0285874 A1* | 12/2005 | Zitnick, III | G06T 15/205 345/592 |
| 2006/0082593 A1* | 4/2006 | Stevenson | G06T 11/40 345/611 |
| 2009/0016603 A1* | 1/2009 | Rossato | G06T 7/0083 382/173 |
| 2009/0180538 A1 | 7/2009 | Visharam et al. | |
| 2011/0216165 A1 | 9/2011 | Misawa | |

FOREIGN PATENT DOCUMENTS

| | | |
|---|---|---|
| EP | 1612738 | 1/2006 |
| JP | 2011186565 | 9/2011 |
| WO | WO02077919 | 10/2002 |
| WO | WO2007105129 | 9/2007 |
| WO | WO2009126260 | 10/2009 |

OTHER PUBLICATIONS

Mori et al: "View Generation with 3D Warping Using Depth Information for FTV"; IEEE, 2008, pp. 229-232.
Zitnick et al: "High_Quality Video View Interpolation Using a Layered Representation", Interactive VisualMedia Group; pp. 600-608.
Schaefer etal: "Truly Interactive Approaches to Browsing Image Databases"; Dept. of Comput. Sci., Proceedings of the Seventh International Conference on Signal-Image Technology & Internet-Based Systems (SITIS 2011) / pp. 340-344 / 2011; IEEE Computer Society.
Schaefer: "Image Browsers : Effective and Efficient Tools for Managing Large Image Collections"; Dept. of Comput.; 2011 International Conference on Multimedia Computing and Systems (ICMCS 2011); 3 pages / 2011; IEEE.
Search Report Dated May 15, 2013.
Doshkov et al., "Towards Efficient Intra Prediction Based on Image Inpainting Methods", 28th Picture Coding Symposium, Nagoya, Japan, Dec. 8, 2010, pp. 470-473.
Guo et al., "Priority-Based Template Matching intra Prediction", 2008 International Conference on Multimedia and Expo, Hannover, Germany, Jun. 23, 2008, pp. 1117-1120.
Moinard et al., "A Set of Template Matching Predictors for Intra Video Coding", 2010 IEEE International Conference on Acoustics, Speech and Signal Processing (ICASSP), Dallas, Texas, USA, Mar. 14, 2010, pp. 1422-1425.
Tan et al., "Intra Prediction by Template Matching", 2006 IEEE International Conference on Image Processing, Atlanta, Georgia, USA, Oct. 8, 2006, pp. 1693-1696.
Turkan et al., "Image Prediction Based on Neighbor-Embedding Methods", IEEE Transactions on Image Processing, vol. 21, No. 4, Apr. 2012, pp. 1885-1898.
Turkan et al., "Image Prediction Based on Non-Negative Matrix Factorization", Acoustics, 2011 IEEE International Conference on Speech and Signal Processing (ICASSP), Prague, Czech Republic, May 22, 2011, pp. 789-792.
Turkan et al., "Image Prediction: Template Matching vs. Sparse Approximation", 2010 IEEE 17th International Conference on Image Processing, Hong Kong, Sep. 26, 2010, pp. 789-792.
Turkan et al, "Sparse Approximation With Adaptive Dictionary for Image Prediction", 2009 IEEE 16th International Conference on Image Processing (ICIP), Cairo, Egypt, Nov. 7, 2009, pp. 25-28.

\* cited by examiner

Figure 4 - Example of virtual triangle

DEALIASING METHOD AND DEVICE FOR 3D VIEW SYNTHESIS

This application claims the benefit, under 35 U.S.C. §365 of International Application PCT/EP13/050701, filed Jan. 16, 2013, which was published in accordance with PCT Article 21(2) on Jan. 3, 2014 in English and which claims the benefit of European patent application No. 12174005.4, filed Jun. 28, 2012.

FIELD OF THE INVENTION

The invention relates to a device and a method for dealiasing borders in 3D view synthesis. The invention relates to rendering of 3D content.

BACKGROUND OF THE INVENTION

View interpolation consists in interpolating a disparity map for the new view, and then in synthesizing the view by interpolating video information using this interpolated disparity map and the left or right views.

Aliasing will appear in the interpolated disparity map. During the view synthesis, the picture information is interpolated using this interpolated disparity map with this aliasing. This introduces aliasing in the projected view.

This problem occurs because the common disparity map format defines only one disparity value per pixel. As a result for a pixel lying on an object border this value can either be the disparity value of the background object or the disparity value of the foreground object. This means that in the disparity map objects have aliased borders. Since this disparity map is used to render the synthesized view, the synthesized view will also show aliased object borders.

A disparity map represents for each pixel the disparity between the left and the right frames or pictures. A depth map represents for each pixel the depth of the corresponding object in the 3D scene. The invention will be described using a disparity map but is exactly the same if using a depth map.

However on object borders for some pixels there is background and foreground video information. But since in the disparity (resp. depth) map only one disparity value per pixel can be stored, this value cannot be exactly correct. For a pixel on the object border this value can either be the disparity value of the background object, the disparity value of the foreground object, or a value in between.

As a result object borders in the disparity map can only be located at pixel borders. This means that in the disparity map object borders exhibit aliasing.

Document D1 (Boundary matting for view synthesis from S. Hasinoff) proposes a method called boundary matting to reduce the "cut-out" appearance. This method exploits multiviews to perform alpha matting and to refine stereo depths at the boundaries with sub-pixel accuracy. The method aims at defining precise object boundaries using the picture information and relies on quite complex matting techniques.

Document D2 (U.S. Pat. No. 6,577,307) discloses an anti aliasing process for 3D graphic rendering. The method retrieves the depth of two nearest polygons, and stores the corresponding color information and a weighing value indicating the percentage of coverage of a pixel. This weighting value is used to blend the foreground and background colors. The object boundaries and the percentage of coverage of a pixel depend only on the position of the polygons which are perfectly known. This method cannot be used in case of view synthesis since the exact object border shapes are not known.

SUMMARY OF THE INVENTION

The present invention is directed to a method of dealiasing borders in a 3D interpolated view, the interpolated view comprising at least foreground pixels with foreground video information (V1) and background pixels with background video information (V2). The method comprises the step of detecting, in an interpolated disparity map, associated to the 3D interpolated view, an aliased border between the foreground pixels with a foreground disparity value (D1) and the background pixels with a background disparity value (D2), the aliased border delimiting an inner aliased contour formed by foreground pixels and an outer aliased contour formed by background pixel, the aliased border having the form of a stair line; determining a weighting/dealiasing coefficient (DC) for each pixel of the outer contour said coefficient corresponding to the part of the pixel area included in the virtual right triangle defined by the two sides of each stair line to the area of the pixel; calculating video information for each pixel of the outer contour in combining the background video information and the foreground video information in a proportion defined by the determined weighting/dealiasing coefficient (DC) and replacing video information for each pixel of the outer contour by the calculated video information.

Thus the present invention proposes a dealiasing method which considers only the data of the disparity map to determine how to combine foreground and background video information.

In a preferred embodiment, the transition video information is calculated in adding to a part corresponding to the weighting/dealiasing coefficient of the foreground video information and the complementary part of the background video information In a preferred embodiment, the inner aliased contour consists in foreground disparity pixels neighbored by pixels so that the absolute difference of a neighbor pixel disparity value with the foreground disparity value is bigger than a determined threshold value.

In a preferred embodiment the outer aliased contour consists in background disparity pixels neighbored by pixels so that the absolute difference of a neighbor pixel disparity value with the background disparity value is bigger than a determined threshold value.

In a preferred embodiment, the given threshold corresponds to one pixel disparity.

In a preferred embodiment, straight lines are segments between stair lines end points.

In a preferred embodiment, straight lines are limited to 32 pixels

In a preferred embodiment, the method is applied to 2D to 3D conversion.

The invention consists, too, in a device for dealiasing a border in a 3D interpolated view, the view comprising at least foreground pixels with a corresponding foreground video information (V1) and background pixels with a corresponding background video information (V2). The device comprises detecting means for detecting in an interpolated disparity map, an aliased border between foreground pixels with a corresponding foreground disparity value (D1) and background pixels with a corresponding background disparity value (D2), the aliased border delimiting an inner aliased contour formed by foreground pixels and an outer aliased contour formed by background pixels, the aliased border having the form of a stair line; determining means for determining a weighting/dealiasing coefficient (DC) for each pixel of the outer contour said coefficient corresponding to the part of the pixel area included in the virtual right triangle defined by the two sides of each stair line to the area of the pixel; calculating means for calculating video information for each pixel of the outer contour in combining the background video information and the foreground video information in a proportion defined by the determined weighting/dealiasing coefficient (DC) and means for replacing the video information for each pixel of the outer contour by the calculated video information.

In a preferred embodiment the calculating means of the device for calculating the transition video information consists in means for adding to a part corresponding to the weighting/dealiasing (DC) coefficient of the foreground video information (V1) the complementary part (1−DC) of the background video information (V2).

In a preferred embodiment, the device is used for 2D to 3D conversion.

BRIEF DESCRIPTION OF THE DRAWINGS

The above and other aspects of the invention will become more apparent by the following detailed description of exemplary embodiments thereof with reference to the attached drawings in which.

So that along the object borders of the interpolated view the pixels video information will be a combination of background and foreground video information.

The view interpolation consists in interpolating a disparity map, either the left disparity map or the right disparity map or both. It consists further in synthesizing the view by interpolating video information using disparity values of the interpolated disparity map, the video information of the left and/or right views.

The aliasing effect occurs because in the 1-layer disparity map format we use, only one disparity value is stored per pixel. Therefore in the disparity map, object borders are located at pixel borders between pixels with a foreground disparity value corresponding to the disparity of the foreground object and pixels with a background disparity value corresponding to the disparity of the background.

Figure 1:
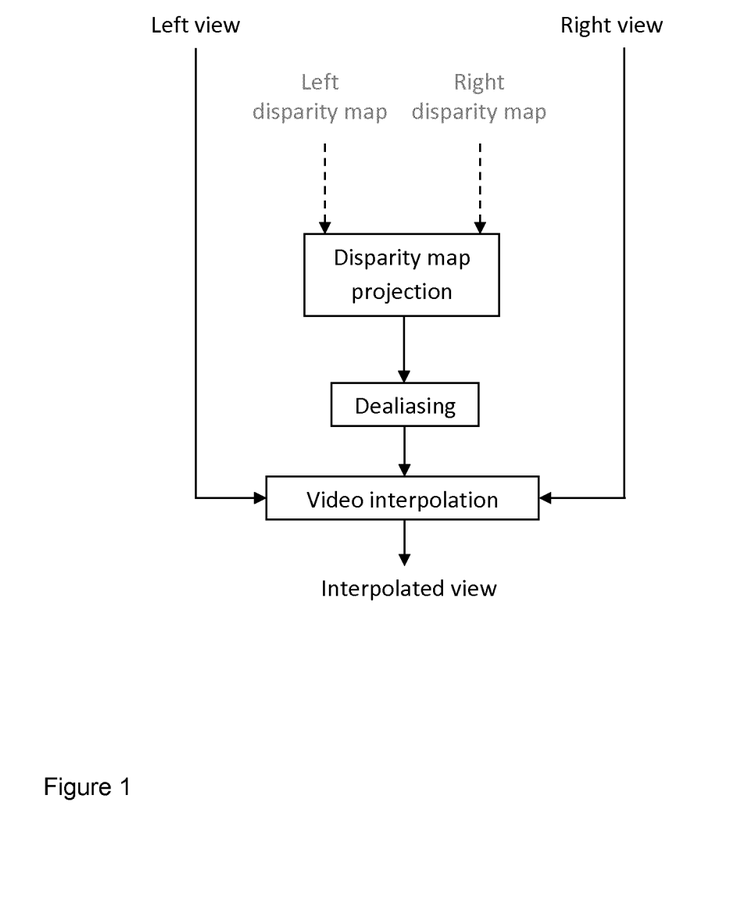
FIG. 1 represents a block diagram corresponding to the interpolation of a view

FIG. 1 corresponds to a block diagram of a 3D view synthesis obtained from a left view and a right view, a left disparity map and a right disparity map. The disparity map projection block consists in projecting at least one disparity map onto the view to be synthesized.

To suppress the aliasing effect, which can appear on the object borders, a dealiasing block according to the invention is added to the disparity map projection block. The video interpolation block combines values of the dealiased disparity map, the left view and the right view to create the interpolated view.

Figure 2:
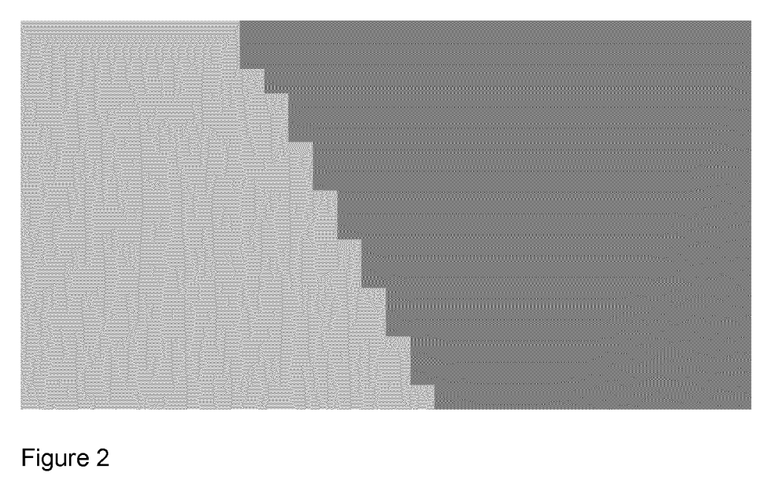
FIG. 2 represents an example of a disparity map with object border

FIG. 2 represents in a disparity map the border of an object in form of stairs corresponding to a pixels border between a foreground disparity value D1 and a background disparity value D2.

A solution according to the invention consists in using locally a 2-layer representation. It is thus possible to store two disparity values per border pixel. But instead of using the video information to define an alpha value using matting information estimation like in Document 1, the invention proposes to simply fill the stairs along the object borders with some foreground video information. The part of foreground video information is determined by a combination of the two disparity values. This is done by detecting the aliased borders in the interpolated disparity map and by virtually adding a sub-pixel shape to smooth these contours.

Thus, the invention proposes a solution which relies on replacing in the interpolated disparity map the stair lines of the aliased contours by virtual straight lines. The lines are "virtual" because these lines will not be visible contrary to the visible stairs.

The corresponding virtual surface between the aliased border and the proposed straight line in the interpolated view is filled with some foreground information. By construction, this process will alter only one line of pixels around the objects.

Therefore to one line of pixels along the object borders will correspond two disparity values, and thus a combination of background and foreground video information.

Each pixel intersecting these virtual triangles will be rendered using foreground and background video information. These two video information values will be combined with a weighting/dealiasing coefficient depending of the virtual line, as it will be further explain with the FIG. 4.

The visibility of aliasing in the rendered image depends on the position of the object borders in the disparity map in relation to the position of the object borders in the video/picture. If the object borders in the disparity map include a "sufficient" part of the background, and if the background is homogeneous, in this case no aliasing will be visible. But as soon as the background is not homogeneous near the disoccluded or occluded area, or as soon as the object borders in the disparity map does not include background video or picture information, aliasing becomes visible. This means that depending on the local configuration, it can be better to have or not to have a part of background included in the segmentation of the foreground object in the disparity map.

These aliasing effects can be quite visible on high contrast borders between foreground and background objects, and can get even more visible when they start moving, even slightly. This can happen for various reasons like slight motion, noise or small instabilities.

This aliasing effect is the result of another artifact: the hard transitions, which occur because the disparity map has hard transitions. Hard transitions appear when there is no soft transition between objects; this happens in the present case because, as we have seen previously, the disparity map cannot correctly handle soft borders. These hard transitions in the synthesized view do not look natural and are usually not consistent with the rest of the picture. The proposed solution suppresses also these hard transitions.

Hard transitions can be seen as the effect of cutting an object along its borders, and then pasting it onto the background; and aliasing as the same effect while cutting the object along pixels borders.

Thus, with the method of the invention, object borders are softened by adding some foreground video information to fill the stairs along the object borders. First, the aliased contours need to be detected. These contours correspond to the object borders in the interpolated disparity map. Therefore we propose to detect them by comparing the disparity values of neighbor pixels in the interpolated disparity map.

Figure 3:
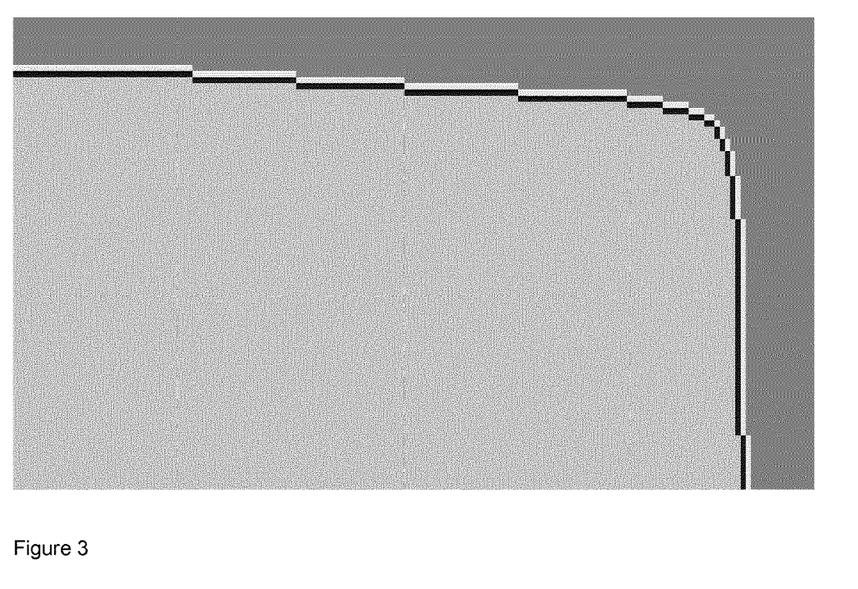
FIG. 3 illustrates the definition of the inner and outer contours according to an embodiment of the invention

In the disparity map two kinds of pixels need to be detected: the pixels belonging to the inner contours with a foreground disparity value D1, and the pixels belonging to the outer contours with a background disparity value D2. FIG. 3 illustrates an aliasing contour in a disparity map with the inner contours represented in black and the outer contours in gray of the aliased border. The inner contours belong to the foreground objects and therefore occlude the outer contours. Pixels belonging to the outer contours are in the local background. These are the pixels to which a second disparity value corresponding to the disparity value of the pixels of the inner contours will be assigned. The inner contour pixels define the aliasing shape, and thus the altering that will be applied to the outer contour pixels.

The object contours can be for example detected by comparing the disparity value of each pixel with the disparity values of its direct neighbor pixels. A pixel can be tagged as belonging to a contour if one of the differences with its neighbor pixels is bigger than a given threshold, for example 1 pixel disparity. And two direct neighbor pixels tagged as belonging to a contour can be tagged as belonging to the same object inner contour if the absolute difference of their disparity values is smaller than a given threshold; for example 0.5 pixel disparity.

Once the object contours have been identified, the contour or aliasing shapes need to be evaluated.

Figure 4:
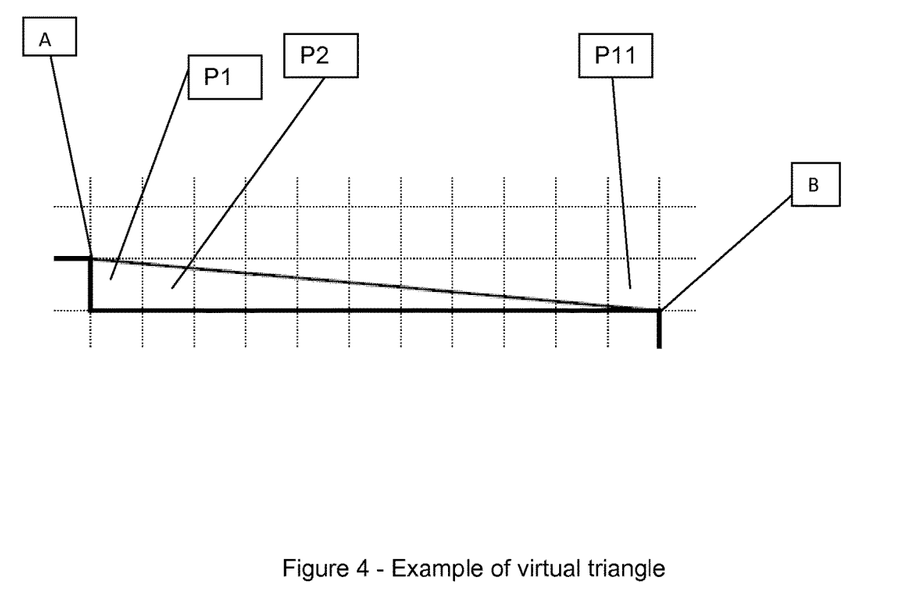
FIG. 4 represents an example of a virtual triangle defined on the contour in the disparity map according to the invention

Referring to FIG. 4, the two end points A and B of the local aliasing element which form a step from the edge to the riser of the aliasing element need to be identified. These end points A and B of a stair are used to define the virtual triangles, and thus a weighting/dealiasing coefficient DC will be defined for each pixel intersecting this defined triangle as following: the weighting/dealiasing coefficients DC for each pixel correspond to the part of the area inner the virtual triangle relative to the area of the pixel.

An example of a virtual triangle is given by the FIG. 4. The weighting coefficients are easy to determine once the virtual triangle is known. For the example in FIG. 4, the weighting/dealiasing coefficients DC1 to DC11 of pixels P1 to P11 correspond to the part of the area inner the virtual triangle relative to the area of the pixel. These weighting/dealiasing coefficients DC1 to DC11 (from left to right) are equal to: 21/22, 19/22, 17/22, 15/22, 13/22, 11/22, 9/22, 7/22, 5/22, 3/22 and 1/22 respectively. Thus with these weighting/dealiasing coefficients DC1 to DC11 which corresponds to the proportion of the foreground disparity in the pixel, a corresponding part of foreground video information will be added to the background video information to fill the stairs along the object borders of the interpolated view. In this example, associated to the pixel P1 the weighting/dealiasing coefficient is DC1=21/22. And consequently associated to the pixel P1, a part corresponding to this weighting/dealiasing coefficient DC1 of the video information is the foreground video information, the complementary part (1−DC1) being background video information. Associated to the pixel P2 the weighting/dealiasing coefficient is DC2=19/22. And consequently, associated to the pixel P2, a part corresponding to this weighting/dealiasing coefficient DC2 of the video information is the foreground video information, the complementary part (1−DC2) being background video information. If a pixel belongs to several virtual triangles, the maximum of the weighting/dealiasing coefficients can be used and it will determine which virtual triangle to use to alter the pixel. More complex solutions evaluating the visible surface of each virtual triangle are also possible taking into account the potential occlusions depending on the local disparity of each virtual triangle.

It is possible to limit the size of the triangles, for example to 32 pixels. A sufficient size can suppress the aliasing effect while bigger sizes would not give significant improvement, and depending on the implementation this can limit the search range for the contours.

This operation assigns two disparity values and one weighting coefficient to each pixel. As indicated above it is possible to assign more disparity values and corresponding weighting coefficients depending on the level of complexity. One disparity value corresponds to background information which is the former disparity value of the outer contour pixel, the others) correspond(s) to the foreground object(s).

The principle of the invention is that added foreground video information to the background video information corresponds to triangular surfaces in the disparity map which is the difference between the aliased contour and the proposed straight line.

The intersection between these triangles and each pixel surface defines indirectly the percentage of foreground video information that will be added to the background video information of each pixel as each pixel intersecting the added triangle will use for the foreground information the same disparity as the closest pixel in the corresponding inner contour. The advantage of using direct neighbor disparity values is that continuous foreground information is used to render the object borders, thus preventing additional visible artifacts from appearing.

In the rendered view, the result will be similar to anti-aliasing applied directly to a perfect 3D model of the views. It is however different since in the present case the aliased object borders are not known as only the aliased border of the disparity map is known.

The invention can be implemented using different methods.

A method of the invention is that the detection of the object contours can be done once for the complete picture, tagging each pixel belonging to an inner and/or an outer contour accordingly. For each inner contour, the local segments of the aliasing shape needs to be identified; this determines the virtual triangles to be added. Then for each outer contour pixel, depending on the virtual triangle intersections with the pixel, and optionally the local disparity of each inner contour depending on the chosen strategy, the inner contour(s) to consider are chosen.

A method of the invention is that the operation can be done pixel by pixel: for each pixel, a preferred method consists in determining if this pixel belongs to an outer contour. For each corresponding inner contour pixel, find the local end points of the aliasing shape by comparing the disparity values of the successive direct neighbors. From these end points which are the positions of the edge and the riser A and B, determine the right triangle surface associated to each inner contour. Then decide which inner contour(s) to consider depending on the virtual triangle intersections with the pixel, and optionally the local disparity of each inner contour. This defines the weighting/dealiasing coefficient linked to each inner contour. Finally the video information value of the pixel can be evaluated using these weighting/dealiasing coefficients, foreground video information and background video information Disparity map and corresponding interpolated video information without dealiasing are represented by the left picture of FIG. 5 and the right picture of FIG. 5 respectively.

Figure 6:
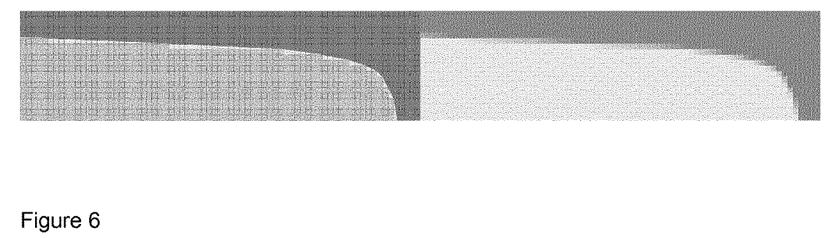
FIG. 6 represents a disparity map and corresponding interpolated video image with dealiasing according to the invention FIG. 7 corresponds to a video image before and after the dealiasing and shows how the aliasing and the "cut-out" appearance are reduced The local contour shape of object aliasing is detected in the disparity map. Accordingly a sub-pixel shape is added to smooth this contour.

Disparity map and corresponding interpolated video with dealiasing are represented by left picture of FIG. 6 and the right picture of FIG. 6 respectively.

Figure 5:
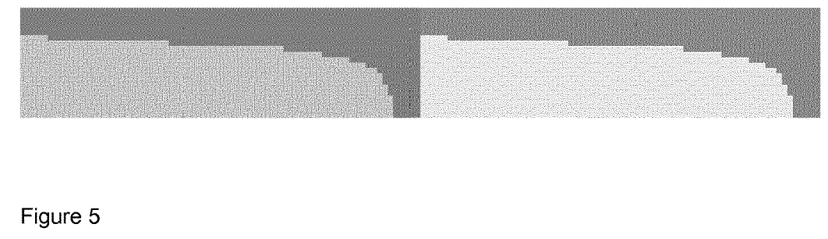
FIG. 5 represents a disparity map and corresponding interpolated video image without dealiasing

The FIGS. 5 and 6 illustrate this process on a basic example. The FIG. 5 shows on the left an interpolated disparity map without dealiasing and on the right the result of video information interpolation without dealiasing. The FIG. 6 shows on the left the same disparity map with the virtual shape, thus indicating the part of the foreground video information to be added to the background video information of the aliased contour. FIG. 6 shows on the right the corresponding result of the interpolated video information using the dealiasing method of the invention.

Figure 7:
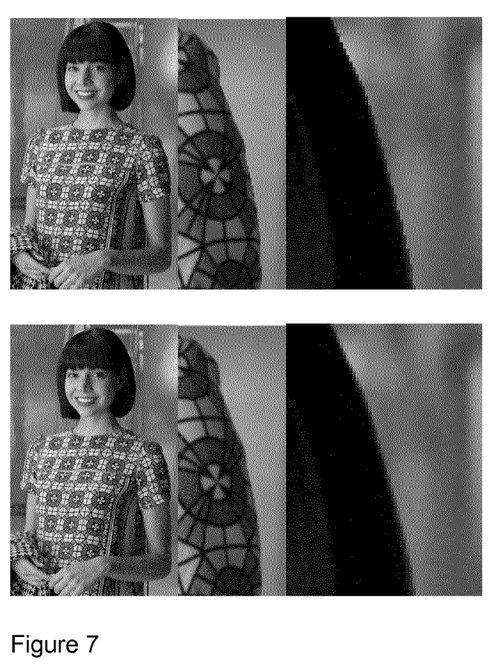

The results on the 3D interpolated view are represented by FIG. 7 by comparing how the aliasing and the "cut-out" appearance are reduced between the above view and the under view.

This problem can also occur during 2D to 3D conversion. The difference is that the disparity map is obtained differently and that the disocclusions are handled differently, using in-painting technique for example.

Since this solution is applied after the disparity map projection, this requires only small modifications of the view synthesis architecture.

This can be used in post-production tools e.g. for 2D to 3D conversion, or for view synthesis, or in TV or in STB to interpolate new views e.g. for depth adjustment.

The invention claimed is:

1. A method of dealiasing a border in a 3D interpolated view, the view comprising at least a border determined by foreground pixels with a corresponding foreground video information and background pixels with a corresponding background video information, the method comprising:
    detecting, in an interpolated disparity map associated with the 3D interpolated view, an aliased border between the foreground pixels with a corresponding foreground disparity value and the background pixels with a corresponding background disparity value, the aliased border delimiting an inner aliased contour formed by foreground pixels and an outer aliased contour formed by background pixel, the aliased border having the form of a stair line;
    determining a weighting/dealiasing coefficient for each pixel of the outer contour said coefficient corresponding to the part of the pixel area included in the virtual right triangle defined by the two sides of each stair line to the area of the pixel, wherein straight lines, limited to 32 pixels, are segments between stair line end points, and form a side of the virtual right triangle;
    calculating video information for each pixel of the outer contour in combining the background video information and the foreground video information in a proportion defined by the determined weighting/dealiasing coefficient; and
    replacing video information for each pixel of the outer contour by the calculated video information.

2. The method of dealiasing as claimed in claim 1 wherein calculating the transition video information consists in adding to a part corresponding to the weighting/dealiasing coefficient of the foreground video information and the complementary part of the background video information.

3. The method of dealiasing as claimed in claim 1 wherein the inner aliased contour consists in foreground disparity pixels neighbored by pixels so that the absolute difference of a neighbor pixel disparity value with the foreground disparity value is bigger than a determined threshold value.

4. The method of dealiasing as claimed in claim 1 wherein the outer aliased contour consists in background disparity pixels neighbored by pixels so that the absolute difference of a neighbor pixel disparity value with the background disparity value is bigger than a determined threshold value.

5. The method of dealiasing as claimed in claim 3 wherein the given threshold corresponds to one pixel disparity.

6. The method of dealiasing as claimed in claim 1 wherein the method is applied to 2D to 3D conversion.

7. A device for dealiasing a border in a 3D interpolated view, the view comprising at least foreground pixels with a corresponding foreground video information and background pixels with a corresponding background video information, comprising:
    at least one processor and a memory, said at least one processor being coupled to said memory and said at least one processor being configured to:
    detect in an interpolated disparity map, an aliased border between foreground pixels with a corresponding foreground disparity value and background pixels with a corresponding background disparity value, the aliased border delimiting an inner aliased contour formed by foreground pixels and an outer aliased contour formed by background pixels, the aliased border having the form of a stair line;
    determine a weighting/dealiasing coefficient for each pixel of the outer contour said coefficient corresponding to the part of the pixel area included in the virtual right triangle defined by the two sides of each stair line to the area of the pixel, wherein straight lines, limited to 32 pixels, are segments between stair line end points, and form a side of the virtual right triangle;
    calculate video information for each pixel of the outer contour in combining the background video information and the foreground video information in a proportion defined by the determined weighting/dealiasing coefficient; and
    replace the video information for each pixel of the outer contour by the calculated video information.

8. The device as claimed in claim 7 wherein the at least one processor is further configured to calculate video information and further configured to add to a part corresponding to the weighting/dealiasing coefficient of the foreground video information the complementary part of the background video information.

9. The device as claimed in claims 7 and 8 wherein the device is used for 2D to 3D conversion.

* * * * *